Aug. 23, 1966     R. E. PICKETT ETAL     3,268,867
PRESSURIZED CABLE MONITORING SYSTEM HAVING DIRECT CURRENT
INTERROGATION OF REMOTE MONITORING APPARATUS
Filed July 16, 1962                2 Sheets-Sheet 1

INVENTORS
ROBERT E. PICKETT
EDWARD E. BAUMAN
BY

REMOTE MONITOR #1

INVENTORS
ROBERT E. PICKETT
EDWARD E. BAUMAN
BY

United States Patent Office 3,268,867
Patented August 23, 1966

3,268,867
PRESSURIZED CABLE MONITORING SYSTEM HAVING DIRECT CURRENT INTERROGATION OF REMOTE MONITORING APPARATUS
Robert E. Pickett, Galion, Ohio, and Edward E. Bauman, Point Pleasant, N.J., assignors to North Electric Company, Galion, Ohio, a corporation of Ohio
Filed July 16, 1962, Ser. No. 210,005
11 Claims. (Cl. 340—152)

The present invention relates to a novel system for centrally monitoring a number of remote positions in the system such as power distribution system, pipeline system, telephone system, and the like, and more particularly for monitoring the gas pressure at each of a plurality of positions located at different points along the length of a pressurized cable.

It has been found in the transmission field, that the capabilities and reliability of certain cable transmission media may be improved by providing a protective sheath for the cable, and maintaining the interior of the protective sheath under gas pressure. With the sheath pressurized in this manner, the entrance of moisture into the cable sheath is substantially minimized, and the consequent electrical problems which might result from moisture entry are substantially reduced. Such practice has found particular application in areas in which a portion of the cable run is necessarily buried underground.

While pressurizing minimizes the problems of cable damage resulting from moisture, it is apparent that cable leaks develop from time to time, and that the reduction of the gas pressure to atmospheric as a result of the leaks will expose the cable to moisture damage.

Various attempts have therefore been made to provide suitable means for monitoring the cable pressures along the transmission path. In one known system, sensing devices were provided at different locations in the system to provide indications of a drop in pressure at such locations. Maintenance crews were then assigned to check the devices in a routine manner for the purpose of locating any leaks. It soon became apparent, however, that many man-hours were spent in traveling from point to point and climbing poles or entering underground locations to visually examine the readings on the sensing devices. Further, the frequency of monitoring such cables by the personnel varied with a number of factors including among others, the changing weather conditions, and the different conditions of the cable at different points along the run. Since the variations were so great and unpredictable, it was necessary to maintain crews which constantly monitored the gas pressure at the different points in the entire system, even though the equipment at any given point might not require servicing for extremely long periods. Such attempt to solve the problem was therefore only partially successful.

In theory, since a small reduction in pressure will indicate minor fractures or leaks of the sheath which do not necessarily result in moisture penetration, it is theoretically possible with careful monitoring of the pressure in the cable to detect a fault prior to moisture entry and prior to the occurrence of damage to the cable. That is, the rate of flow will obviously increase with the occurrence of the leak, and a constant check of the rate of flow of gas into the injection point in the cable should provide an indication of a leak or break. However, the flow rate of gas in the cable is quite low, and as a result, a leak area in long lines may reduce the area to atmospheric pressure long before the remote flow indicator will indicate the break.

In still other arrangements radio-active gas is used, and service men periodically search for leaks with detection equipment which is operative to detect the escaping gas. As in the previously described method, such form of maintenance requires special crews with a periodic maintenance schedule, and is therefore a costly arrangement.

Further, the frequency of monitoring from a practical standpoint was necessarily such that the occurrence of a break would frequently result in entry of moisture and damage to the cable prior to detection of the break.

In other approaches, pressure-actuated contactors including a resistor member were installed at various points along the cable. Switch means associated with the resistor at each point were operative to connect the resistance member to close a direct current loop to a central station whenever the contactors operated as a result of reduction in pressure in the cable to a predetermined value. The location of the leak was then determined by measurement of the loop resistance. In such arrangement, however, variations in the cable parameters will provide erroneous indications as to the location of the leak, and in the event that several contactors close on the same wire pair during the same time period, it is not possible to ascertain the specific location of any of the faults from the indications provided by the loop.

It is an object of the present invention, therefore, to provide a novel monitoring system for effecting constant monitoring of a large number of locations along a pressurized cable system including means for providing an instantaneous indication of a fault, and the location thereof, in a more reliable and efficient manner.

It is a further object of the invention to provide a novel system of such type in which a large number of locations may be reliably monitored over a single cable pair, and in which an even larger number of points may be monitored by providing a plurality of cable pairs, and common equipment for use in the provision of a visual display of the conditions at each of the positions on the different cables.

It is a further object of the invention to provide a novel system of such type in which tone signalling is utilized to provide an indication of the condition at a point, and in which loss of pressure at the point results in a frequency shift, the unit providing a first frequency to indicate normal pressure and a second frequency to indicate abnormal pressure. In one embodiment including such arrangement absence of a signal is used to indicate loss of power, etc., at a remote point.

It is another object of the invention to provide a system which includes means at the central office for selectively energizing each two-wire cable in the system independent of the other cables, and means in each remote monitor connected to the energized cable operative to transmit tone signals back to the central office over the same conductor pair.

The foregoing objects and features of the invention and others which are believed to be new and novel in the art, are set forth in the following specification, claims and drawings, in which:

*General description*

Figure 1:
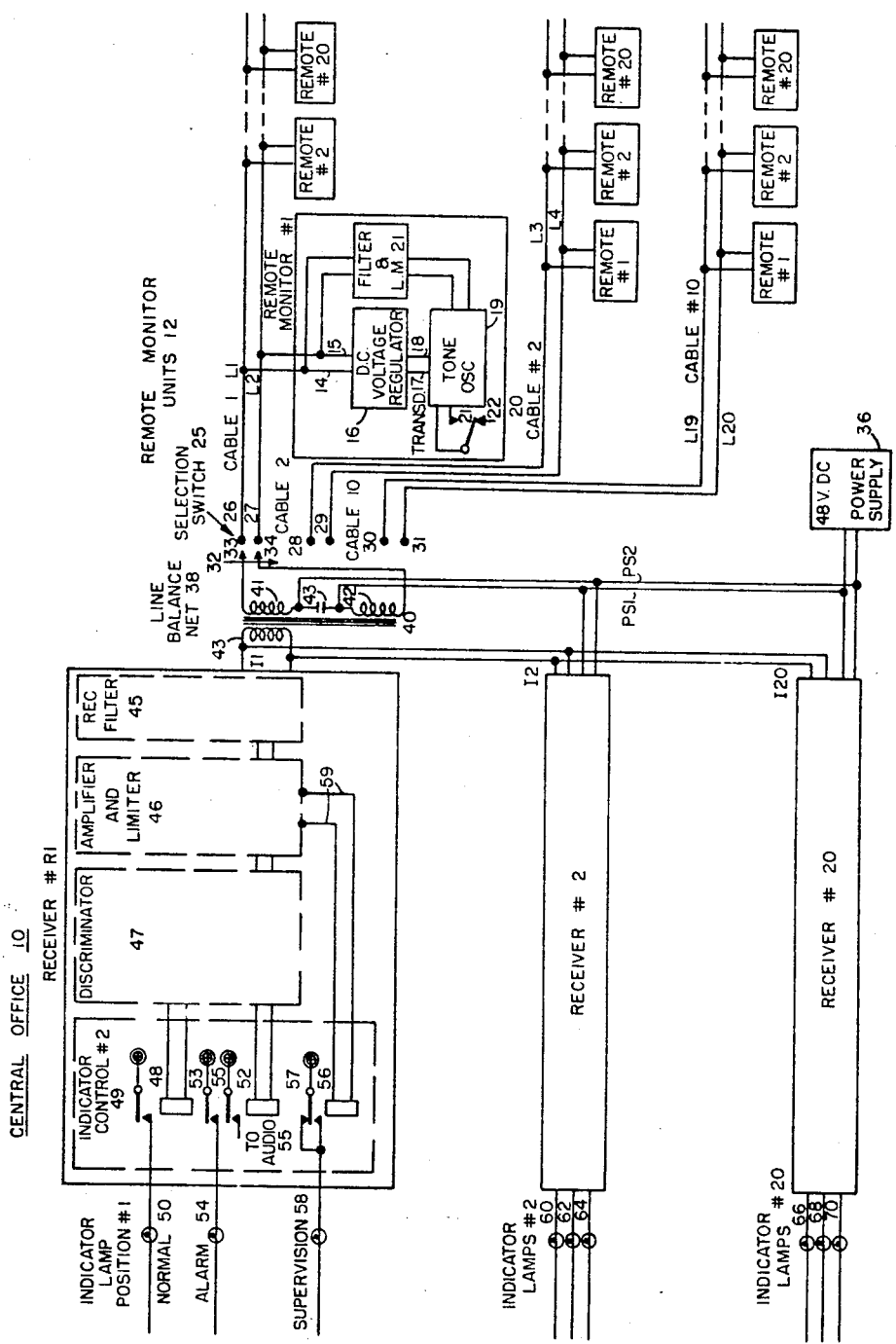
FIGURE 1 is a partially schematic diagram of the system including the central office and remote monitoring units for the different cables.

The novel system of the present invention includes a central office station which includes common equipment for monitoring the pressure at selected remote points on each of a plurality of cables. In one arrangement, each remote point for a cable includes a monitor device, and a two-wire conductor pair connects the monitors at the different points along the cable to the central office. Selector means at the central office, either manually or automatic, permit selection of each cable and the group of remote monitors which are connected to the cable, different positions on the switch effecting selection of different cables of the group. Common equipment at the central office including receiver equipment is operative in response to the signals received from the monitor devices to provide instantaneous visual displays of the conditions at each remote monitor on the selected cable.

In the disclosed embodiment, each of the remote monitors includes a frequency-shift tone generator for transmitting signals representative of the conditions at its associated positions over the two-wire cable to the central office. As noted hereinafter, the frequency shift device at each of the remote stations is operative to transmit a first frequency over its associated cable to indicate normal pressure, and a second frequency of a different value to indicate abnormal pressure. Absence of either signal is used to indicate a loss of power, a failure of components in the equipment at the remote unit, and other similar conditions. The different frequencies transmitted by the remote devices for one cable are different from each other. However, the frequencies transmitted by the devices in one group are the same as the frequencies transmitted by the devices in the other groups.

In one embodiment, a group of twenty remote devices were connected to each two-wire cable, whereby ten cables provided a total of two-hundred remote indicator devices. Whenever more than twenty stations are required in a group, the cable may be provided with additional frequency assignments. If more than forty remote units are required to operate within a normal voice band width, or where the voltage drop to the most remote unit of a group exceeds 49 volts, a special repeater is provided which permits the use of successive cable lengths in series, each accommodating up to forty monitor units. Thus a system will readily accommodate two-hundred monitor units spaced at one mile intervals.

The common equipment at the central office includes a selector switch for selecting each of the cables which extend to the remote monitors, and a plurality of receiver units, the number of receivers being consistent with the number of remote monitors connected to the one of the cables in the system having the largest number of monitors. In the system disclosed herein, each cable is shown as having twenty remote monitor units associated therewith, and accordingly the central office will include twenty receiver units. With operation of the selector switch to interrogate a cable which includes a group of remote monitors, the receiver units are instantaneously operated by the signals received over such cable to energize common indicator lamps to provide a visual display of the condition of the pressure conditions at the remote monitor points on the selected cable. In the event that a remote unit reports a pressure failure or fails to indicate a normal pressure, or in the event of power failure or the like, the indicator lights advise the operator as to the location of the failure, and a common audio and visual alarm are sounded.

In one embodiment, the console unit at the central office for a system having five cables with twenty monitor units each, comprised a standard 19-inch sloping front housing approximately 48 inches high. The indicators were arranged in a convenient format with associated designation means for identifying the cable selected by the selector switch and the remote unit in each group selected.

Each of the remote units were housed in a structure approximately 4" x 4" x 10", which were waterproof, sealed housings adapted for direct exposure or burial beneath the ground.

*Specific description*

The circuitry of the novel system of the present invention is schematically shown in FIGURE 1. As there shown, the system basically comprises a central office 10 including means for providing indications of the pressure at each of a number of points on each of a plurality of two-wire cables (cables 1–10) as detected by a plurality of remote monitor units 12.

Each remote monitor unit, such as remote unit 1 on cable 1, includes a pair of conductors 14, 15 for connecting the remote monitor to its associated cable, such as cable 1. Direct current placed on the cables 14, 15 at the central office 10 is transmitted by conductors 14, 15 to a direct current voltage regulator 16 which in turn provides a regulated voltage output over conductors 17, 18 to a tone oscillator 19.

Each remote monitor includes a pressure transducer 20 connected to the cable to detect the pressure in the cable sheath at such point and to control the operation of a switch arm to a first position 21 to indicate a normal pressure condition and to a second position 22 to indicate an abnormal pressure condition. In one embodiment the pressure switch comprised a device commercially available as a Type C 2060 from The Bristol Company. Such switch is of the subminiature type and includes a transfer switch operable between the first position 21 and the second position 22 with the occurrence of a predetermined change in the pressure conditions in the cable sheath at the point of connection of the transducer to the cable.

The tone oscillator 19, as shown in more detail hereinafter, is operative to generate a first frequency signal with movement of the switch arm of transducer 20 to the first position, and is operative to provide a second frequency signal responsive to movement of the transducer switch arm to the second position 22. A filter line matching circuit 21 is connected to couple the frequency signal output of the tone oscillator 19 over conductors 14 and 15 to the two conductors L1, L2 of its associated cable 1. Conductors 14 and 15 for the remote monitors are thus used to couple the power from the central office 10 and conductors L1, L2 to the remote monitor, and are also used to transmit the signal output of the monitor over associated cables L1, L2 to the central office 10. The remote monitor units 1–20 in the group connected to conductors L1, L2 of cable 1 are each adjusted to alternately provide one of two frequencies, the two frequencies provided by each monitor being different than the frequency provided by the other monitors connected to the cable. Thus twenty different frequencies will appear on conductors L1, L2 of cable 1 when the cable is selected for monitoring. The remote monitors 1–20 of cable 2, cable 3, etc., are adjusted to provide the same frequency signals as the corresponding monitors on cable 1.

The central office 10 includes a selector switch 25 having a pair of fixed contacts, such as 26, 27 for each of the cables, such as cable 1, and a movable selector arm 32 having a pair of contacting arms 33, 34 which are selectively movable to engage contacts 26, 27; 28, 29; etc., for the different cables. The selector switch arms 33, 34 are in turn connected to the input circuit for a line balancing network 38, the output circuit of which is connected to the input circuits for each of the receivers R1–R20. The number of receivers as shown hereinafter is determined by the number of remote monitors on the cable having the largest group of monitors connected thereto.

Line balancing network 38 basically comprises a transformer 40 having a two section primary winding 41, 42 intercoupled by a capacitor 43 and a secondary winding 43. The opposite ends of the primary sections 41, 42 are connected to switch arms 33, 34 and the capacitor coupled ends are connected over conductors PS–1, PS–2 to a direct current power supply 36. The power conductors PS–1, PS–2 are also connected to each of the receivers R1–R20 to provide an energizing source therefor.

The secondary winding 43 of transformer 40 is connected to the input circuits I–1, I–2, I–20 for the receivers 1–20 respectively. Each receiver unit R1 is a commercially available unit which basically includes an input circuit connected to the signal output of secondary winding 43 of transformer 40 and a receiver filter 45 having a pass band which includes each of the two frequencies of the twenty frequencies which are assigned for use with such receiver.

The two frequency outputs detected by receiver filter 45 in receiver R1, for example, are connected over an amplifier and limiter circuit 46 and a discriminator crcuit 47 to indicator relays 48 and 52 respectively. The first indicator relay 48 is connected to operate responsive to receipt of the first frequency signal of the remote monitor at position 1 on the selected cable, and at its contacts 49 is connected to energize lamp 50, which as shown hereinafter, indicates normal pressure conditions for remote monitor 1 on the selected cable. Relay 52 is operative responsive to transmission of the second frequency by the remote monitor at positon 1 on the selected cable, and at its contacts 53 completes an energizing circuit for lamp 54, which as shown hereinafter, indicates an alarm condition (pressure below an acceptable value), and at its contacts 55 completes an energizing circuit to a common alarm lamp 72 and a common audio alarm 74 (not shown) which are connected to operate whenever any one of the alarm relays in each of the receivers R1–R20 is operated.

In the present embodiment, a third indicator relay 56 is connected to the amplifier limiter 46 to operate whenever either of the two assigned frequencies for receiver 41 are detected by receiver filter 45, and relay 56 is operative at its contacts 57 to complete an energizing circuit for supervision lamp 58 to indicate that the remote monitor is transmitting one of the two frequencies, and that the receiver equipment R1 has received and detected the transmitted one of the frequencies. Each of the other receiver units R2–R20 are similarly constructed.

Figure 2:
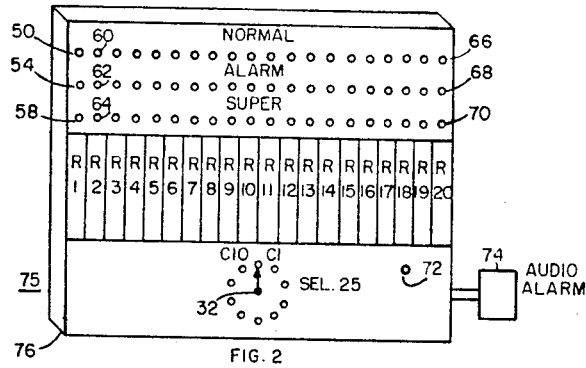
FIGURE 2 is a diagram of one embodiment of the console unit at the central office in the monitoring system.

With reference to FIGURE 2, a console model 75 is shown thereat for housing the central office circuitry and equipment shown in FIGURE 1. As there shown, the housing includes a front plate 76 having an indicator panel including a row of twenty normal lamps 50, 60, 66, associated with recievers R1, R2, R20 respectively, a row of twenty alarm lamps 54, 62, 68 associated with receivers R1, R2, R20 respectively, and a row of supervision lamps 58, 64, 70 associated with receivers R1, R2, R20 respectively.

In the embodiment shown in FIGURE 2, receivers R1, R20 are built as modular units, and console unit 75 is constructed to receive the modules immediately below the indicator lamp panel. As there shown, the receivers R1–R20 are supported in side by side relation in a horizontal row to permit ready access to each of the receiver units. Since the only difference between the receivers R1–R20 is the frequencies detected, adjustable means are provided to permit adjustment of the units to detect different frequencies whereby interchange of the units as desired may be expeditiously accomplished.

Selector switch 25 is also mounted on the front panel, and selector arm 32 of switch 25 is manually or automatically adjustable to each of ten positions C1–C10 to individually select each of the ten cables C1–C10.

Assuming now that the attendant operates selector arm 32 to position C1 on selector switch 25 (manually or electrically), the row of normal lamps, the row of alarm lamps and the row of supervision lamps on the console will be instantaneously energized to indicate the pressure condition at each of the remote points 1–20 which are connected to cable 1.

More specifically, with reference to FIGURE 1, as the selector arm 32 is adjusted to move contacts 33, 34 into engagement with contacts 26, 27, direct current is connected from the power supply 36 in the central office 10 over power supply conductors PS–1, PS–2, primary windings 41, 42 of transformer 40, and contacts 33, 34; 26, 27 of selector switch 25 to conductors L1, L2 of cable 1, and the input conductors 14, 15 for each of the remote monitor units 1–20 connected to cable 1. As shown hereinafter, each of the remote monitor units 1–20 on cable 1 is energized by the direct current connected to cable 1 responsive to selection of cable 1 by switch 25, and in its operation generates the one of two frequencies which is assigned to the monitor to represent the existing pressure conditions. Different monitors associated with the cable are assigned different frequency pairs.

As a result of selection of cable 1 by switch 25, twenty different frequencies will be simultaneously coupled over conductors L1, L2, contacts 26, 27; 33, 34 of selector switch 25, the primary windings 41, 42 of transformer 40, secondary windings 43 and the inputs I–1, I–20 for each of the receiver units R1, R20. With reference to the first receiver unit R1, the one of the two assigned frequencies for monitor 1 which has been coupled to the line by remote monitor 1 will be detected by receiver filter 45, amplified by amplifier 46 and coupled to discriminator circuit 47, which in turn energizes the one of the two relays 48, 52 which is connected to represent the detected frequency.

That is, if the transducer switch arm is in the first position 22, the remote monitor transmits the frequency $f1$ which is assigned to represent a normal condition, and discriminator circuit 47 effects operation of relay 48, and the energization of normal lamp 50. Alternatively, if the switch arm of transducer 20 is in the second position 21, the remote monitor has transmitted the frequency $f2$ assigned to represent an alarm condition, and the discriminator circuit 47 will effect the operation of relay 52 which at its contacts 55 completes an energizing circuit for audio alarm 74 and common alarm lamp 72, and at its contacts 53 will complete an energizing circuit for the alarm lamp 54. In the event that either of the two assigned frequencies is detected by receiver filter 45, the signal output of amplifier 46 is also coupled over conductors 59 to relay 56, which operates and at its contacts 57 completes an energizing circuit for supervisory lamp 58. Each of the receivers R2–R20 is operative in a similar manner to effect energization of the normal or alarm lamp associated therewith as well as its associated supervisory lamp.

Assuming each of the normal lamps for cable 1 is energized as a result of selection of cable C–1, the attendant advances the selector arm to position C2 to effect the selection of cable 2, and the energization of each of the remote monitors which are connected to conductors L3, L4 of cable 2. The indications previously provided by the three rows of lamps on the display panel 76 are thereby removed, and a new set of indications representative of the conditions at the points monitored on cable 2 are instantaneously provided by the same lamps on the panel.

In this manner each of the cables in the system may be selectively engaged, and the remote monitors associated therewith are energized to provide the attendant with an indication of the addition of the pressures for each monitored position on the cables in the system in an extremely expeditious and reliable manner.

*Remote monitor unit*

Figure 3:
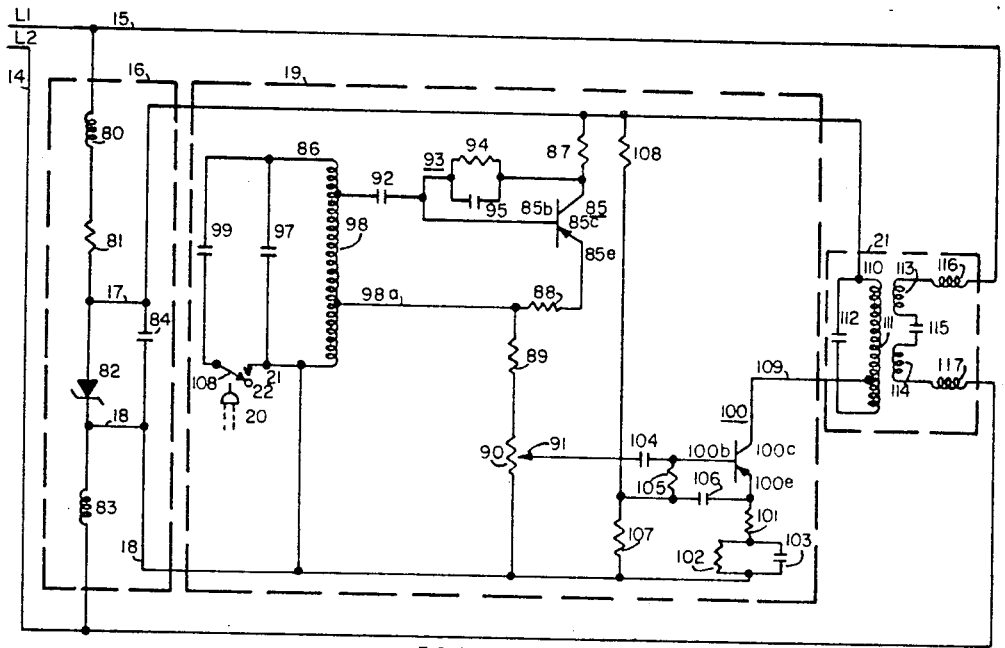
FIGURE 3 is a detailed circuit diagram of the remote monitor at one of the remote positions.

With reference to FIGURE 3, the circuit diagram for one embodiment of a remote monitoring unit is shown in detail thereat. As illustrated in block in FIGURE 1, the remote monitor unit at position 1 on cable 1 basically comprises a pair of conductors 14, 15 for connecting the monitor unit to the cable conductors L1, L2, a direct current voltage regulator 16, connected over conductors 14, 15 to the cable conductors L1, L2, a tone generator 19 connected over conductors 17, 18 to the output of the voltage regulator 16, a transducer 20 having a switch arm operable between the two positions 21, 22 to adjust the frequency output of the tone oscillator 19 to correspondingly different frequencies, and a filter and line matching circuit 21 for coupling the frequencies generated by the tone generator 19 to the conductors 14, 15 and conductors L1, L2 of cable 1.

The voltage regulator unit 16 (FIG. 3) basically comprises an inductor 80, resistor 81, Zener diode 82 and inductor 83 connected in series across conductors 14 and 15, and a capacitor 84 connected across diode 83.

The series circuit including elements 80, 81, 82, 83 provides a constant voltage drop of approximately 10 volts across the Zener diode 82, and whenever cable 1 is selected at the central office 10 (and the direct current power supply 36 at the central office 10 is coupled to conductors L1, L2 on cable 1), the series circuit effects the charging of capacitor 84 to 10 volts. Capacitor 84 thus constitutes a direct current potential source for the monitor unit during any period that cable 1 is selected and energized by the central office equipment.

Inductor windings 80, 83, resistance 81 and capacitor 84 operate as a filter to isolate the tone output of the other transmitters connected to cable 1 from reaching the direct current input circuit for the illustrated monitor unit.

Tone generator 19 comprises a first transistor 85 connected with associated components as a Class C, Hartley type oscillator, and a second transistor 100 connected as a power amplifier to amplify the signal output of transistor 85, and to couple the amplified signals to the filter and line matching circuit 21.

More specifically, transistor 85 includes collector elements 85c connected over resistor 87 to one side of the potential source 84 and also over an RC circuit 93, including parallel-connected resistor 94 and capacitor 95, to the base element 85b. Emitter element 85e is connected over resistances 88, 89 and 90 to the second side of the potential source 84. A split inductance resonant tank circuit 86 including inductance 98, a first capacitor 97 (and at times, as shown hereafter, a second capacitor 99) is connected to transistor 85 to operate same as a Class C, Hartley type oscillator. That is, one point on inductor 98 is connected over capacitor 92 to the collector-base circuit of transistor 95, and a second point on inductor 98 is connected over conductor 98a to the junction of resistors 88, 89 in the emitter circuit of transistor 85. The lower end of tank 86 is connected to the second side of the potential source 84.

Capacitor 92 couples the alternating current path from the collector of transistor 85 to the tank 86 and emitter 85e, while yet maintaining isolation between the bias circuits for the emitter 85e and collector 85c. Capacitor 95 connected in the base-collector circuit of transistor 85 provides a small amount of negative feedback from the collector 85c to the base 85b to effect frequency stabilization. Resistors 87 and 88 limit the emitter-collector, direct current which is drawn by the transistor in its operation as an oscillator, the value of resistor 87 determining the period of conduction of the transistor during the Class C operation.

Transducer 20 is connected to adjust the amount of capacitance in the tank circuit 86 to different values, and includes a switch arm 108 operable between positions on contacts 21 and 22 to effect such variation. In the present embodiment with normal pressure conditions in the cable, the switch arm 108 of transducer 200 engages contact 22. The tank circuit 86 at such time is comprised of inductance 98 and capacitor 97, and the oscillator circuit will generate signals at frequency $f1$. In the event that an alarm condition is detected by the transducer 20, the switch arm 108 of transducer 20 is moved to position 21, and capacitor 99 is connected in parallel with capacitor 97 and inductor 98. At such time, the oscillator circuit will operate to produce signals at frequency $f2$. In the present embodiment, therefore, frequency $f1$ is generated whenever the transducer is to indicate a normal condition, and frequency $f2$ is generated whenever an alarm condition is to be indicated.

The system tone generators are designed to generate standard teletype multiplex frequencies, each of the different frequency signals provided by a tone generator being spaced 120 cycles apart, and the frequencies of different tone generators being spaced by 120 cycles. The lowest generated frequency was 425 cycles, whereby it is possible to obtain up to 40 frequencies without exceeding the maximum frequency of approximately 5000 cycles. In one embodiment, the tone oscillators which produced the higher frequencies were located in the monitor units which were positioned closer to the central office end of the cable. Thus, since the attenuation at the higher frequencies is greater than that at the lower frequencies, the system arrangement tends to make the received signal levels at the central office more nearly equal. An adjustable resistance in each monitor unit permits adjustment of the signal output of the monitor units, and adjustment was made in such units on each cable to provide a fairly uniform signal level at the central office by each of the remote monitor units.

The output frequencies of the tone oscillator 19 are amplified by the second transistor 100 which includes collector 100c, base 100b and emitter 100e. Base 100b is connected over capacitor 104 to the adjustable arm 91 on resistor 90 in the emitter circuit of the oscillator transistor 85, and also over resistance 105 to the voltage divider including resistances 107, 108. Emitter 101e is connected over resistance 101 and parallel RC circuit including resistance 102 and capacitor 103 to the second side of the potential source of capacitor 84, and also over capacitor 106 to the base circuit of transistor 100. Collector 100c is connected over the primary winding 111 of transformer 110 in the line matching circuit 21 to the first side of the potential source 84.

The alternating current output of the oscillator transistor 85 which appears in the emitter circuit is thus coupled over capacitor 104 to the base 100b of transistor 100 in the power amplifier. Resistor 90 is adjustable to provide a variable voltage divider for adjusting the voltage input to the power amplifier to the proper operating values. Resistors 105, 107, 108 determine the input impedance of the power amplifier.

Capacitor 106 connected between the emitter of transistor 100e and the lower end of resistor 105 in the base circuit provides an alternating current feedback which causes the voltage across resistor 105 to decrease in accordance with the value of the feedback signal, which in turn reduces the current drain over resistor 105. As a result of the current drain over capacitor 106 being reduced, the power amplifier continues to appear as a high impedance to the oscillator stage, and loading of the oscillator is minimized to insure frequency stabilization. The output of the power amplifier stage is coupled over conductor 109 and the primary 111 of transformer 110 in line matching circuit 21.

Line matching circuit 21 basically comprises a transformer 110 having a primary winding 111 and a two-section secondary winding 113, 114 intercoupled by capacitor 115. A capacitor 112 is connected across primary winding 111, and the primary winding 111 of transformer 110 is connected in the collector circuit of power amplifier 100. The secondary winding 113, 114 of transformer 110 is connected over filters 116, 117, and conductors 15, 14 respectively to conductors L1, L2 of cable C1. Transformer 110 isolates tone generator 19 from the direct current on the line conductors L1, L2, and the half section filter 116, 117 (which is tuned to the fundamental frequency output of the tone oscillator 199) is operative to prevent frequencies other than the two assigned frequencies from entering transformer 110 from the line conductors L1, L2. Capacitor 115 connected at the center point of the split secondary windings 113, 114 of transformer 110 makes it possible to minimize the number of capacitors and the size of the capacitors which would normally be required in the filter circuit 21.

In the present embodiment, frequency shift of the tone oscillator output is effected by insertion or removal of a second capacitor 99 in shunt of the inductor 98 and capacitor 97 in tank circuit 86. The frequency of the tone is increased with the insertion of the capacitor 99 in parallel with capacitor 97, and is reduced with removal of the capacitor 99 therefrom. Alternatively, the frequency could be increased by having the pressure transducer 20 adjust the conductor 98a upwardly to tap a correspondingly reduced section on the inductor 98. Basically, the frequency is shifted downwardly by the addition of capacitance or inductance in the tank circuit, and is shifted upwardly by reducing the capacitance or inductance in the circuit.

It will be apparent from the foregoing description that with operation of the selector switch 25 (FIGURE 1) at the central office 10 to select a cable, such as cable 1, and to couple direct current from source 36 to the conductors L1, L2 of cable 1, each of the remote monitors, such as monitor 1 (FIGURE 3) will be energized, and in such energization, will generate one of two frequencies assigned to such monitor to indicate either a normal or a fault condition.

The signals generated by each of the energized monitors on cable 1 are transmitted over the line conductors L1, L2 to the central office 10, and each of the receivers R1–R20, each of which is assigned to detect the frequency output of a different one of the monitors, is operative to energize the indicators to display the information provided by the received frequency signals for the period selection of such cable is effected by selector switch 25.

Operation of selector switch 25 to select another cable effects transfer of the power from cable 1 to the cable selected to thereby provide a new set of information to the indicators.

In certain embodiments, the remote units are adjusted to operate in the "tone on" or "tone off" manner. That is, in the "tone off" method, each of the oscillators is idle whenever the transducer operates to indicate normal operating conditions. In the event that the pressure in the cable drops below a value which is considered acceptable, the transducer 20 will operate to energize the tone oscillator 19 and effect transmission of the assigned signal tone to the central office 10. Thus, loss of pressure at several remote points is represented by the transmission of a corresponding number of discrete frequencies over the selected cable to the master station equipment. One advantage of such type arrangement is the absence of signals on the cable whenever all remote units are in the normal condition, as well as the absence of noise and crosstalk generated by the transmission of such signals.

In the embodiment in which "tone on" method of operation is used, all oscillators operate to continually generate a signal when the transducer indicates a normal condition. As the transducer indicates loss of pressure at a remote monitor unit, such oscillator removes the signal from the signal generator and the removal of the signal provides an indication to the attendant of the fault at the remote monitor.

In one operable embodiment of a tone transmitter having the value of the components for effecting frequency output of 1620 cycles in one condition of operation and a 1570 cycle tone in the second condition of operation, the following value of components were used:

Capacitors:

| | |
|---|---|
| 84 | 10 mf. |
| 97 | .039 mf. |
| 92 | .25 mf. |
| 95 | .001 mf. |
| 104 | 1 mf. |
| 106 | 50 mf. |
| 112 | .62 mf. |
| 115 | 3050 mmf. |
| 106 | 10 mf. |
| 99 | 2600 mmf. |

Inductors:

| | |
|---|---|
| 90+83 | 5 henries. |
| 98 (lower portion) | 515 turns; 44 millihenries. |
| 98 (lower and middle portion) | 795 turns; 106 millihenries. |
| 98 (total turns) | 1208 turns; 247.5 millihenries. |
| 111 (lower primary portion) | 584 turns. |
| 111 (upper primary portion) | 1132 turns. |
| 111 (total primary winding) | .495 henries. |
| 113 | 52 turns. |
| 114 | 52 turns. |
| 116 | .495 henries. |
| 117 | .495 henries. |

Resistors:

| | |
|---|---|
| 81 | dependent on distance from receiver. |
| 94 | 100K. |
| 87 | 1820 ohms. |
| 88 | 560 ohms. |
| 89 | 100K. |
| 90 | 10K. |
| 108 | 310K. |
| 107 | 27K. |
| 105 | 3.9K. |
| 101 | 560 ohms. |
| 102 | 410 ohms. |

Zener diode:

| | |
|---|---|
| 82 | SV810 (10 volts). |

Impedance at output end:

| | |
|---|---|
| 2 | 600 ohms. |

Impedance of tank C7, L3 as seen from circuit side: 19K.

Conclusion

The novel pressure monitoring system set forth hereinbefore makes possible the reliable, accurate and continuous monitoring of the pressure at a large number of remote points on each of a number of cables in a more economical manner. The novel remote monitor units which utilize semiconductor elements for the active components result in maintenance-free remote units which are of a less expensive construction and which require minimum power in operation.

The novel manner in which the components at the remote monitoring unit are interconnected permits provision of a system in which only two wires are required to connect the monitor units at a large number of remote points to the central office, while yet effecting both selective energization of the remote monitors from the central office, and transmission of tone signals from the remote monitors to the central office. The use of active elements in the remote monitor results in the provision of maximum signal power at the central office for indication purposes, the complete isolation of the effects of cable parameters, and a system which operates with a minimum audio band width.

It should be appreciated that the monitoring of extended length cables can be accommodated by providing a local power supply for each of the extended length sections of cable, whereby the local power supply is used to operate a group of oscillators associated with the section and its power supply. The selective enablement of the local power supplies may be accomplished by the transmission of tones (other than those used for reporting) from the main station to receivers associated with the extended sections.

The novel arrangement at the central office set forth herein permits the use of common equipment in the presentation of indications to the attendant of the condition of an extremely large number of remote positions, while yet effecting such indications in a more reliable and dependable manner.

Although only certain particular embodiments of the invention have been shown and described, it is apparent that modifications and alterations may be made therein, and it is intended in the appended claims to cover all such modifications and alterations as may fall within the true spirit and scope of the invention.

What is claimed is:

1. In a monitoring system including a central office having a direct-current power source common to the system, a plurality of cables, each of which cables has a separate group of remote monitor means connected thereto, each of said remote monitor means including a tone generator means operative to transmit a signal over its associated cable to indicate at least one predetermined condition at the point monitored thereby, selector means at said central station for selectively connecting said direct-current power source to each cable independent of the other cables to energize the tone generator means connected thereto, indicator means at said central office connected to provide indications of said predetermined condition at each of the different remote monitor units for a selected cable as indicated by the received signals, and receiver means controlled by the signals received over the selected cable to energize said indicator means in the provision of a display of the information indicated by said received signals.

2. In a monitoring system including a central office having a direct-current power source common to the system, a plurality of two-conductor cables, each of which cables has a separate group of remote monitor means connected thereto, remote monitor means including a tone generator means operative to transmit a signal over its associated two conductor cable to indicate at least one predetermined condition at the point monitored thereby, selector means at said central station for selectively connecting said direct-current power source to each two-conductor cable independently of the other cables to energize the tone generator means connected thereto, indicator means at said central office for providing indications of said predetermined conditions at each of the different remote monitor units for a selected cable, and receiver means controlled by the signals received over the selected two-conductor cable to energize said indicator means in the provision of a display of the information indicated by said signals.

3. In a monitoring system including a central office having a direct-current power source common to the system, a plurality of two conductor cables, each of which cables has a separate group of remote monitor means connected thereto, each of said remote monitor means including a tone generator means operative to transmit tone signals over its associated cable to indicate a normal and a fault condition at the point monitored thereby, the tone signals generated by different ones of the generator means in the group for a cable being of a different value, the frequency signals generated by the generator means on the different cables being the same, selector means at said central office for selectively connecting said direct-current power source to each cable independently of the other cables to energize the tone generator means connected thereto, indicator means at said central office for providing indications of normal and fault conditions for each of the different remote monitor units for a selected cable, and receiver means controlled by the signals received over the selected cable to energize said indicator means in the visual display of the information indicated by said signals.

4. In a monitoring system including a central office having a direct-current power source, a plurality of cables, each of which cables has a separate group of remote monitor means connected thereto, each of said remote monitor means including a tone generator means operative to transmit frequency signals over its associated cable to indicate a normal and a fault condition at the point monitored thereby, selector means at said central station operative to selectively connect said direct-current power source to each cable and the monitor units connected thereto independent of the other cables, indicator means at said central office for providing indications of normal and fault conditions for each of the different remote monitor units for an energized cable, and receiver means controlled by said signals received over said cable to energize said indicator means to provide a display of the information indicated by the signals.

5. A system as set forth in claim 4 in which each of said cables comprise a two conductor path, and in which each remote monitor includes a two wire circuit for connecting the monitor to the two wires of the associated cable, means connected to said two wire circuit for deriving an operating potential from said energized cable, and means for coupling the tone output of said tone generator over said two wire circuit to said cable.

6. A system as set forth in claim 4 in which said central office includes a plurality of receiver means, each of which is tuned to detect the tone signal provided by a different one of the remote monitor units connected to a selected channel, and control means in said receiver means operatively controlled by the receiver responsive to detection of the assigned tone signal to energize the indicator means to display the condition represented by the tone signal.

7. In a monitoring system including a central office having a direct-current power source, a plurality of cables, each of which cables has a separate group of remote monitor means connected thereto, each of said remote monitor means including a tone generator means operative, as energized, to transmit a first frequency signal over its associated cable to indicate a normal condition and a second frequency signal to indicate a fault condition at the point monitored thereby, transducer means for adjusting the frequency signals generated by a tone generator means to different values responsive to a change in pressure at the point monitored by said transducer means, selector means at said central station operative to selectively connect said direct-current power source to a cable and the monitor units connected thereto, indicator means at said central office for providing indications of the conditions for each of the different remote monitor units for a selected cable, and receiver means controlled by said signals received over said selected cables to energize said indicator means in the provision of a display of the information indicated by the signals.

8. A system as set forth in claim 7 in which said tone generator means includes an oscillator circuit having a resonant circuit, and in which said transducer means includes means for adjusting the parameters of said resonant circuit to different values responsive to changes in the condition of the pressure thereat to thereby effect a change in the value of the frequency generated by said tone generator means.

9. In a monitoring system including a central office having a direct-current power source, a plurality of cables, each of which cables has a separate group of remote monitor means connected thereto, at least one of said remote monitor means including a tone generator means operative to transmit a frequency signal over its associated cable to indicate at least one predetermined pressure condition at the point monitored thereby, transducer means connected to indicate the occurrence of said condition including means for controlling the tone generated by said tone generator means, selector means at said central station operative to selectively connect said direct-current power source to a cable and the monitor units connected thereto, indicator means at said central office for providing indications of said condition for each of the different remote monitor units for a selected cable, and receiver means controlled by said signals received over the selected cable to energize said indicator means to display the conditions indicated by the received signals.

10. A system as set forth in claim 9 in which each remote monitor connected to the cable includes direct-current voltage regulator means controlled by the power on said cable to provide a regulated potential for the tone generator means.

11. A system as set forth in claim 9 in which said remote monitor means includes line matching means for isolating the output of the tone generator from the direct-current on the line, and means for isolating the tone of other transmitters on the cable from the energizing potential for the tone generator.

References Cited by the Examiner
UNITED STATES PATENTS

| | | | |
|---|---|---|---|
| 2,398,761 | 4/1946 | Aiken | 340—171 |
| 2,784,393 | 3/1957 | Schultheis | 340—171 |
| 3,034,100 | 5/1962 | Brixner | 340—182 |
| 3,099,816 | 7/1963 | Miller | 340—163 |

NEIL C. READ, *Primary Examiner.*

L. HOFFMAN, H. I. PITTS, *Assistant Examiners.*